United States Patent
Asher et al.

(10) Patent No.: US 11,711,395 B2
(45) Date of Patent: Jul. 25, 2023

(54) USER-DETERMINED NETWORK TRAFFIC FILTERING

(71) Applicant: Verizon Patent and Licensing Inc., Basking Ridge, NJ (US)

(72) Inventors: Shelly E. Asher, Pittsburg, CA (US); Jude M. Munn, Bay Point, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/647,062

(22) Filed: Jan. 5, 2022

(65) Prior Publication Data
US 2022/0131893 A1 Apr. 28, 2022

Related U.S. Application Data

(63) Continuation of application No. 16/277,122, filed on Feb. 15, 2019, now Pat. No. 11,233,816.

(51) Int. Cl.
 *H04L 9/40* (2022.01)
(52) U.S. Cl.
 CPC ...... *H04L 63/1441* (2013.01); *H04L 63/1425* (2013.01)
(58) Field of Classification Search
 CPC ............ H04L 63/1441; H04L 63/1425; H04L 63/145; H04L 63/0236; H04L 63/1458; H04L 63/0263
 See application file for complete search history.

(56) References Cited

U.S. PATENT DOCUMENTS

| 7,007,302 | B1 | 2/2006 | Jagger et al. |
| 8,230,505 | B1 | 7/2012 | Ahrens et al. |
| 9,015,839 | B2 | 4/2015 | Ibatullin et al. |
| 9,426,124 | B2 | 8/2016 | Pope et al. |
| 9,967,279 | B2 | 5/2018 | Chesla et al. |
| 10,511,614 | B1 | 12/2019 | Aziz |
| 2005/0193429 | A1 | 9/2005 | Demopoulos et al. |
| 2008/0276313 | A1* | 11/2008 | Kummu ............ H04L 63/1441 717/174 |
| 2009/0006847 | A1* | 1/2009 | Abzarian ............. H04L 63/20 726/1 |

(Continued)

FOREIGN PATENT DOCUMENTS

| CN | 102332072 A | * | 1/2012 | ............. G06F 21/56 |
| CN | 108566382 A | * | 9/2018 | ......... H04L 41/0631 |

*Primary Examiner* — Michael R Vaughan

(57) ABSTRACT

A device processes a communication between a source and user equipment. The user equipment is one of a plurality of user equipment connected to a network and the user equipment is associated with an entity. The device determines that the communication is associated with an anomalous traffic pattern. The device implements a provisional blocking of traffic between the source and the plurality of user equipment connected to the network and generates a filtering rule based on determining the anomalous traffic pattern, where the filtering rule prescribes that traffic between the source and the second user equipment is to be blocked. The device transmits a notification to the entity associated with the user equipment that requests that the entity affirm the filtering rule, and the device blocks traffic between the source and the user equipment based on the entity affirming the filtering rule.

20 Claims, 7 Drawing Sheets

(56) References Cited

U.S. PATENT DOCUMENTS

| | | | |
|---|---|---|---|
| 2015/0326532 A1* | 11/2015 | Grant | H04L 63/20 |
| | | | 726/1 |
| 2018/0054419 A1 | 2/2018 | Shanks et al. | |
| 2018/0351993 A1 | 12/2018 | Lee et al. | |
| 2019/0207907 A1* | 7/2019 | Savintsev | H04L 63/1441 |

* cited by examiner

500 →

510 — Process a communication between a source and user equipment, wherein the user equipment is one of a plurality of user equipment connected to a network, wherein the user equipment is associated with an entity 520 — Determine that the communication is associated with an anomalous traffic pattern, wherein the anomalous traffic pattern is at least one of a first traffic pattern of the source or a second traffic pattern of the user equipment 530 — Implement a provisional blocking of traffic between the source and the plurality of user equipment connected to the network based on determining the anomalous traffic pattern 540 — Generate a filtering rule in connection with the source and the user equipment based on determining the anomalous traffic pattern, wherein the filtering rule prescribes that traffic between the source and the user equipment is to be blocked 550 — Transmit a notification to the entity associated with the user equipment, wherein the notification requests that the entity affirm the filtering rule 560 — Block traffic between the source and the user equipment based on the entity affirming the filtering rule

FIG. 5

USER-DETERMINED NETWORK TRAFFIC FILTERING

RELATED APPLICATION

This application is a continuation of U.S. patent application Ser. No. 16/277,122, entitled "USER-DETERMINED NETWORK TRAFFIC FILTERING," filed Feb. 15, 2019, which is incorporated herein by reference in its entirety.

BACKGROUND

Network traffic filtering is used to control network access by monitoring outgoing and incoming packets. Packets can be allowed to pass or can be halted, as defined by filtering rule sets, based on the source and destination Internet Protocol (IP) addresses, protocols, and ports.

BRIEF DESCRIPTION OF THE DRAWINGS

FIG. 5 is a flow chart of an example process for user-determined network traffic filtering.

DETAILED DESCRIPTION OF PREFERRED EMBODIMENTS

Figure 1A:
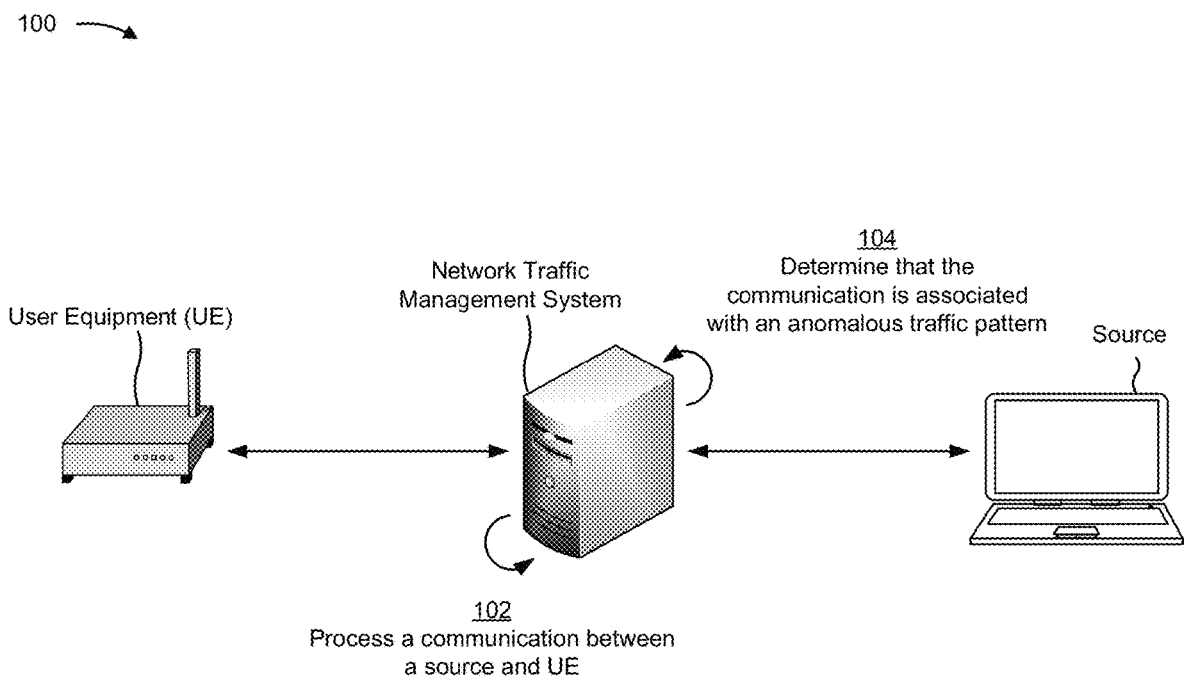
FIGS. 1A-1C are diagrams of one or more example implementations described herein.

The following detailed description of example implementations refers to the accompanying drawings. The same reference numbers in different drawings can identify the same or similar elements.

A user equipment (UE) connected to a network can be identified by a public IP address for communications with an external data network (e.g., the Internet). Sometimes, a UE is assigned a public static IP address so that the UE can be consistently, and reliably, reached via the Internet. However, a UE identified by a static IP address is vulnerable to security attacks from the Internet. For example, a malicious actor also can consistently reach the UE by the static IP address, thereby providing the malicious actor with sufficient time and opportunity to identify the UE on a network, subvert any security measures protecting the UE, and repeatedly access the UE thereafter.

In some cases, a UE can be assigned a static IP address when the UE is configured with the network. As a result, multiple UEs associated with the same entity can receive respective static IP addresses that are not sequentially numbered. Accordingly, the entity can experience difficulty detecting network discovery behavior (e.g., a ping sweep, a port sweep, a port scan, etc.) of a malicious actor. For example, a malicious actor can employ a network discovery technique that transmits requests to sequentially numbered host addresses on the network to determine the host addresses that map to live hosts. Thus, such network discovery behavior can go unnoticed by an entity that shares a range of sequentially numbered IP addresses with one or more unrelated entities.

Network discovery behavior (e.g., a ping sweep that sends hundreds or thousands of requests to host addresses on the network) that is not detected and allowed to continue can waste resources of the network and/or computing resources (e.g., processing resources, memory resources, and/or the like) of one or more UEs affected by the network discovery behavior. Furthermore, network discovery behavior is commonly an indication of upcoming malicious activity. Thus, if the network discovery behavior is not detected and resolved, one or more UEs connected to the network can experience an intrusion by a malicious actor that can result in diverted computing resources and network congestion (e.g., where a UE is infected with software that causes the UE to send spam email or engage in a distributed denial of service (DoS) attack) as well as lead to compromised sensitive data (e.g., private video feeds, personally identifying information, transaction card identifiers, and/or the like).

In a related issue, attempts to prevent network discovery behavior and subsequent intrusion into UEs by blocking unknown external sources can result in network security policies that are overly broad. Accordingly, legitimate inbound and outbound traffic of the network might be blocked, thereby causing certain UEs to become unreachable or unable to communicate outside of the network. As a consequence, services provided by UEs connected to the network can experience disruptions and become less reliable.

Some implementations described herein include a network traffic management system that monitors traffic on a network to detect anomalous traffic patterns relating to a source (e.g., a source outside of the network). The network traffic management system can provisionally block traffic between the source and UEs connected to the network, generate a filtering rule relating to traffic between the source and one or more particular UEs connected to the network, and transmit a notification to an entity associated with the one or more particular UEs that requests that the entity affirm or decline the filtering rule. The network traffic management system can block traffic between the source and the one or more particular UEs if the entity affirms the filtering rule or can allow traffic between the source and the one or more particular UEs if the entity declines the filtering rule.

In this way, anomalous traffic patterns that are not detectable by a single entity can be recognized and resolved by the network. Accordingly, network security can be improved, thereby conserving network resources and/or computing resources (e.g., processing resources, memory resources, and/or the like) associated with network discovery behavior and intrusion into UEs that would otherwise be possible. In addition, the network traffic management system described herein permits a security policy to be implemented on a network level, while being directed to a particular entity and/or one or more particular UEs connected to the network. As a result, overly broad traffic filtering that is sometimes associated with network level security policies can be avoided, thereby improving reliability of communications on the network and reducing disruptions to services provided by UEs connected to the network.

Figure 1B:
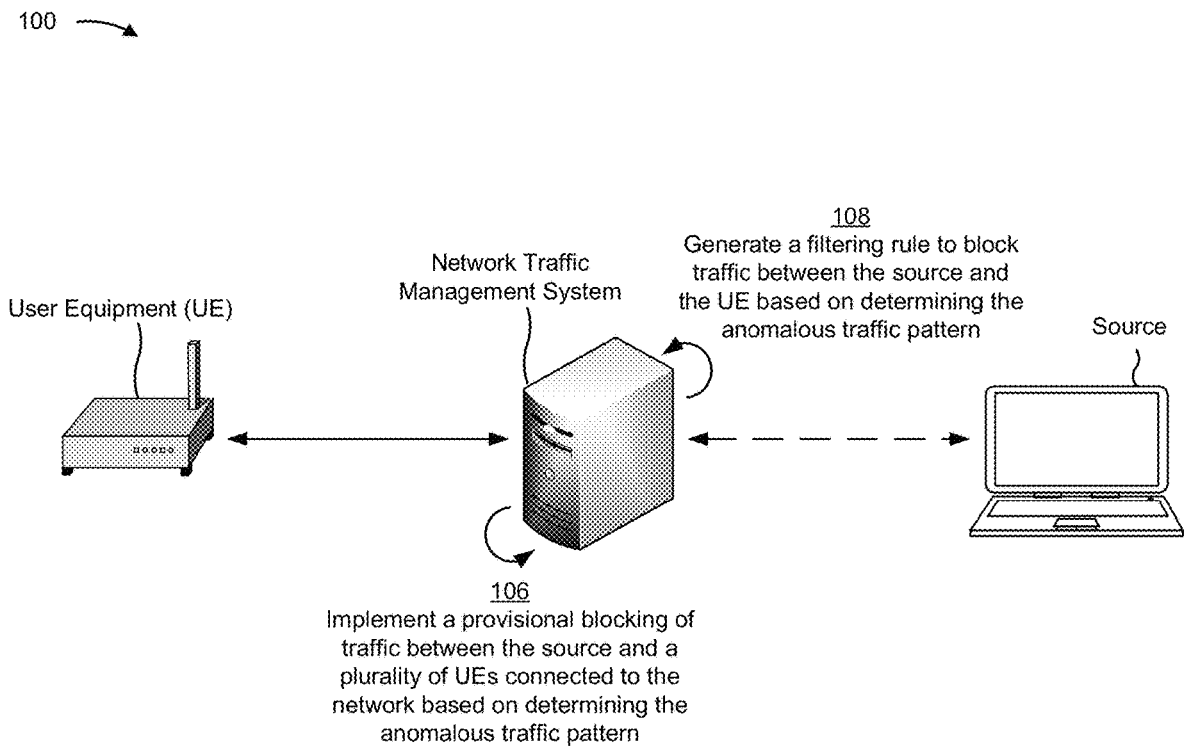
Figure 1C:
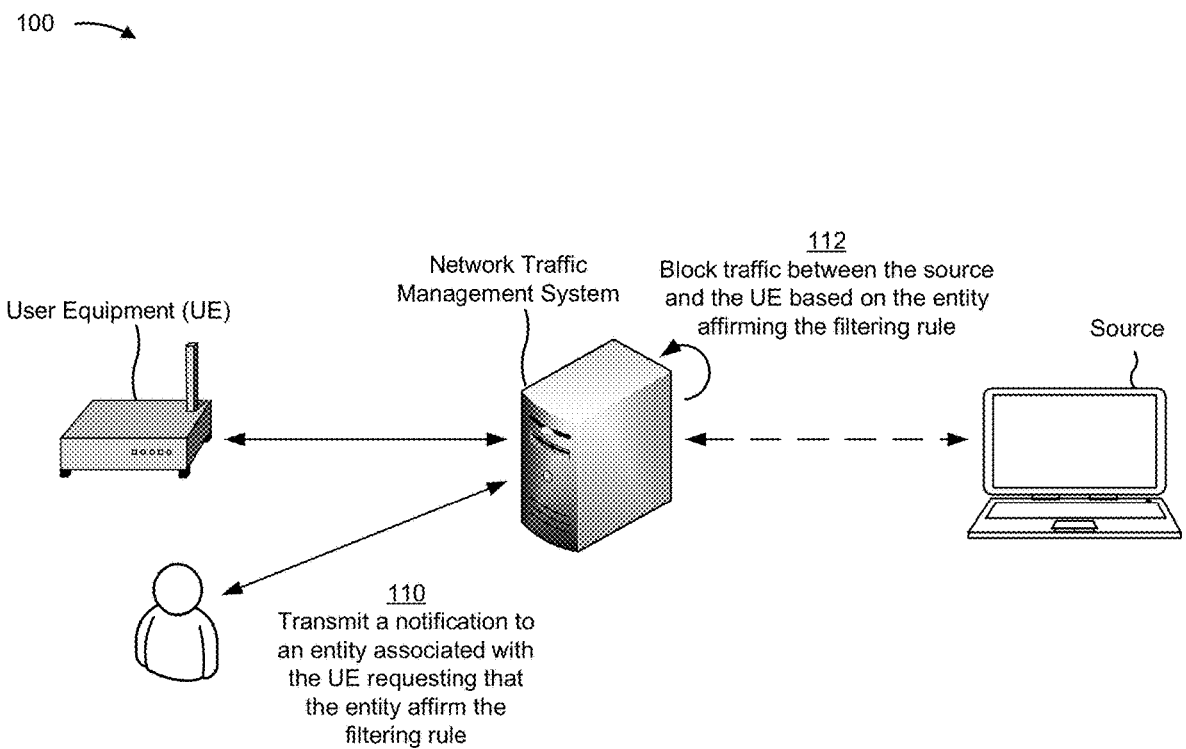

FIGS. 1A-1C are diagrams of one or more example implementations 100 described herein. As shown in FIGS. 1A-1C, example implementation(s) 100 can include a network traffic management system associated with a network (e.g., a core network of a mobile network). In some implementations, the network traffic management system can monitor communications on the network to detect an anomalous traffic pattern and recommend filtering rules based on the anomalous traffic pattern. In some implementations, the network traffic management system can be implemented by a single device (e.g., a server device) or a distributed computing system that employs a plurality of devices (e.g., server devices, cloud computing devices, etc.). In some implementations, the network traffic management system can be associated with a plurality of entities (e.g., individuals and/or enterprises).

In some implementations, the network of the network traffic management system can be a wide area network (WAN), such as a wireless WAN, a wired WAN, or a hybrid wireless and wired WAN. In some implementations, a plurality of UEs can be connected to the network (e.g., the WAN). Subsets of the plurality of UEs connected to the network can be associated, respectively, with one of the plurality of entities. For example, one or more first UEs connected to the network can be associated with a first entity and one or more second UEs connected to the network can be associated with a second entity. In some implementations, a UE can be a mobile device, such as a smart device (e.g., an Internet-enabled parking meter, an Internet-enabled electronic billboard, an Internet-enabled video camera, an Internet-enabled tracking device, etc.). As described herein, a UE can refer to any UE that is connected to the network or to UEs connected to the network that are associated with an entity that has elected to filter traffic.

In some implementations, a UE connected to the network can be identified by a public static IP address for communications with an external data network (e.g., the Internet). Accordingly, an entity can remotely communicate with one or more UEs via the external data network. For example, the entity can transmit one or more communications to a UE (e.g., via a web interface) that can relate to performing maintenance or diagnostics on the UE, obtaining data from the UE, changing a setting or a configuration of the UE, and/or the like. As another example, the UE can transmit one or more communications to the entity that can relate to providing data to the entity, indicating a status of the UE, and/or the like.

As shown in FIG. 1A, and by reference number 102, the network traffic management system can process a communication between a source (e.g., a source outside of the network) and a UE connected to the network. For example, the network traffic management system can facilitate delivery of the communication to a destination (e.g., a UE) specified in the communication. In some implementations, the communication processed by the network traffic management system can be an inbound communication from the source to the UE. In some implementations, the communication processed by the network traffic management system can be an outbound communication from the UE to the source.

In some implementations, the network traffic management system can generate, or update, a record with information identifying the communication. In some implementations, the network traffic management system can generate, or update, the record with one or more session data associated with the communication, such as an address (e.g., an IP address) of an origin and/or a destination of the communication, a port identified in the communication, a protocol of the communication, a transmission time and/or a delivery time of the communication, a geographic location of the origin and/or the destination of the communication, and/or the like. Additionally, or alternatively, the network traffic management system can generate, or update, the record with one or more filtering data associated with the communication (e.g., whether the communication was blocked by a traffic filter or allowed by the traffic filter). In some implementations, the network traffic management system can store, or cause another device to store, the record in a data structure (e.g., a database, a linked list, a table, and/or the like).

In some implementations, the network traffic management system (e.g., a traffic filter of the network traffic management system) can compare one or more filtering rules to information associated with the communication to determine whether the communication is to be allowed or blocked based on the one or more filtering rules. For example, the network traffic management system can block the communication from reaching a destination (e.g., a UE) identified in the communication based on determining that a filtering rule indicates that traffic between a source of the communication and the destination is to be blocked.

As shown by reference number 104, the network traffic management system can determine whether a communication between a source and a UE connected to the network is associated with an anomalous traffic pattern. In some implementations, the network traffic management system can evaluate one or more records of inbound and/or outbound traffic of the network to determine the anomalous traffic pattern. For example, the network traffic management system can evaluate records of inbound and/or outbound traffic occurring over a previous time period (e.g., 1 second, 5 seconds, 10 seconds, etc.) to determine the anomalous traffic pattern.

In some implementations, the anomalous traffic pattern can relate to a traffic pattern of the source (e.g., a source outside of the network). For example, the network traffic management system can determine an anomalous traffic pattern based on detecting that a communication to a UE is from a source that is unknown. In some implementations, the source can be unknown because the UE has not previously received a communication from the source. In some implementations, the source can be unknown because not one of a plurality of UEs associated with an entity have previously received a communication from the source. In some implementations, the source can be unknown because no UE connected to the network has previously received a communication from the source.

Additionally, or alternatively, the network traffic management system can determine that a communication from a source is associated with an anomalous traffic pattern where the traffic pattern is indicative of a network discovery behavior (e.g., a ping sweep traffic pattern, a port sweep traffic pattern, a port scan traffic pattern, and/or the like). For example, the network traffic management system can determine the anomalous traffic pattern based on detecting that the source made queries (e.g., pings) to sequentially numbered addresses (e.g., IP addresses) of the network (e.g., a last digit (or set of digits) of a first address of the network is sequential with a last digit (or set of digits) of a second address of the network). As another example, the network traffic management system can determine the anomalous traffic pattern based on detecting that the source made queries to a same port of sequentially numbered addresses of the network. As an additional example, the network traffic management system can determine the anomalous traffic pattern based on detecting that the source made queries to multiple ports (e.g., ports associated with vulnerable services) of an address of the network.

In some implementations, the anomalous traffic pattern can relate to a traffic pattern of the UE. For example, the network traffic management system can determine an anomalous traffic pattern based on detecting that a communication from the UE is to a source that is unknown. In some implementations, the source can be unknown because the UE has not previously sent a communication to the source. In some implementations, the source can be unknown because not one of a plurality of UEs associated with an entity have previously sent a communication to the source. In some implementations, the source can be unknown because no UE connected to the network has previously sent a communication to the source.

In some implementations, the network traffic management system can determine an anomalous traffic pattern based on detecting a communication between a first UE connected to the network and a second UE connected to the network. For example, the network traffic management system can determine an anomalous traffic pattern based on observing a communication between a first UE associated with a first entity and a second UE associated with a second entity that is not related to the first entity. Such a traffic pattern can indicate that one or both of the first UE and the second UE were infected with malicious software.

In some implementations, an anomalous traffic pattern can be associated with a temporal parameter. For example, the network traffic management system can determine that a traffic pattern associated with a network discovery behavior is an anomalous traffic pattern when the traffic pattern occurs within a time interval (e.g., 1 second, 10 seconds, 30 seconds, etc.). As another example, the network traffic management system can determine that a traffic pattern associated with an unknown source is an anomalous traffic pattern when multiple communications between a UE and the unknown source occur over a time period (e.g., 1 hour, 1 day, 1 week, etc.). In some implementations, the anomalous traffic pattern can be associated with a threshold number of communications. For example, the network traffic management system can determine that a traffic pattern is an anomalous pattern when a number of communications included in the traffic pattern satisfies a threshold value (e.g., 5 communications, 10 communications, 25 communications, etc.).

In some implementations, the network traffic management system can determine an anomalous traffic pattern based on an output of a machine learning model that has been trained to identify an anomalous traffic pattern based on information relating to inbound and/or outbound network traffic. This can be useful when UEs connected to the network communicate with unknown sources that are legitimate and/or when legitimate traffic produces a traffic pattern that can be mistaken for a network discovery behavior.

In some implementations, after determining the anomalous traffic pattern, the network traffic management system can compare information identifying the source (e.g., an IP address) associated with the anomalous traffic pattern to information identifying a plurality of known sources (e.g., a plurality of IP addresses). In some implementations, information identifying a known source identifies the known source as a security threat. For example, a known source can be identified as a security threat based on the known source being previously associated with network discovery behavior, distributing malware, data scraping, a DoS attack, etc.

In some implementations, one or more records containing information identifying known sources can be stored in a data structure (e.g., a database, a linked list, a table, and/or the like). The data structure can be maintained by the network or by a third party. In some implementations, information identifying one or more known sources can be retrieved from, or inserted into, the one or more records by an administrator of the network or a third party via an application programming interface (API) (e.g., a web service). In some implementations, proposed filtering rules in connection with one or more known sources can be retrieved from, or inserted into, the one or more records by an administrator of the network or a third party via the API.

As shown in FIG. 1B, and by reference number 106, the network traffic management system can implement a provisional blocking of traffic between a source and a plurality of UEs connected to the network based on determining that a communication relating to the source is associated with an anomalous traffic pattern. The network traffic management system can implement the provisional blocking of traffic between the source and the plurality of UEs even when the anomalous traffic pattern does not relate to one or more of the plurality of UEs. For example, if the anomalous traffic pattern relates to a first plurality of UEs, the network traffic management system can implement the provisional blocking of traffic between the source and the first plurality of UEs and/or between the source and a second plurality of UEs to which the anomalous traffic pattern does not relate.

In some implementations, the network traffic management system can implement the provisional blocking of traffic by generating a filtering rule for a traffic filter of the network traffic management system and providing the filtering rule to the traffic filter. In some implementations, the filtering rule for the provisional blocking of traffic is determined based on a degree of a security threat (e.g., a low security threat, a moderate security threat, a high security threat, etc.) indicated by the anomalous traffic pattern and/or the source associated with the anomalous traffic pattern.

For example, the filtering rule can prescribe that traffic between the source and all UEs connected to the network is to be blocked (e.g., if the anomalous traffic pattern and/or information associated with the source indicates a security threat to all UEs connected to the network, such as where the source is a known source identified as a high security threat). As another example, the filtering rule can prescribe that traffic between the source and all UEs associated with the anomalous traffic pattern is to be blocked (e.g., if the anomalous traffic pattern and/or information associated with the source indicates a security threat to only the UEs associated with the anomalous traffic pattern, such as where the source has not transmitted a request to a UE connected to the network for a time period after the anomalous traffic pattern). As an additional example, the filtering rule can prescribe that traffic between the source and all UEs of an entity having at least one UE associated with the anomalous traffic pattern is to be blocked (e.g., if the anomalous traffic pattern and/or information associated with the source indicates a security threat to UEs related to the UEs associated with the anomalous traffic pattern). As a further example, the filtering rule can prescribe that traffic between the source and all UEs identified by addresses that fall within a range of addresses (e.g., a range of addresses that includes an address of a UE associated with the anomalous traffic pattern) is to be blocked (e.g., if the anomalous traffic pattern and/or information associated with the source indicates a security threat to all UEs in a range of addresses, such as where the anomalous traffic pattern is indicative of a ping sweep or a port sweep).

In this way, the network traffic management system can begin to provisionally block traffic between the source and one or more UEs connected to the network while awaiting respective directives regarding the source from the plurality of entities with UEs connected to the network. Accordingly, further communications between the source and the one or more UEs connected to the network can be prevented, thereby conserving network resources and/or computing resources that would otherwise be wasted by network discovery behavior of the source or an intrusion of the source into one or more UEs connected to the network. In addition, selectively blocking traffic between the source and one or more UEs based on the degree of the security threat conserves network resources and/or computing resources that would otherwise be wasted by blocking legitimate traffic (e.g., where legitimate traffic is resent after being blocked).

In some implementations, the network traffic management system can determine the degree of the security threat indicated by an anomalous traffic pattern and/or a source associated with the anomalous traffic pattern based on an output of a machine learning model that has been trained to identify a degree of a security threat based on information relating to inbound and/or outbound network traffic. This can be useful when a source is unknown and/or when a narrowly defined provisional blocking of traffic is desired.

In some implementations, the provisional blocking of traffic can persist for a time period (e.g., 1 hour, 1 day, 1 week, 1 month, etc.). For example, an administrator of the network traffic management system can configure the time period for which the provisional blocking of traffic persists for all UEs connected to the network. As another example, an entity associated with one or more UEs connected to the network can configure the time period for which the provisional blocking of traffic persists with regard to the UEs of the entity. In some implementations, the provisional blocking of traffic can persist with regard to one or more UEs of an entity until the entity provides a directive regarding the source, as described below.

As shown by reference number 108, the network traffic management system can generate a filtering rule to block traffic between a source and a UE connected to the network based on determining the anomalous traffic pattern. In some implementations, the network traffic management system can generate the filtering rule based on determining the anomalous traffic pattern and determining that the source is a known source that is identified as being a security threat. After generating a filtering rule, the network traffic management system can store the filtering rule in a queue, or another repository, while awaiting a directive from an entity to which the filtering rule relates.

In some implementations, the network traffic management system can generate respective filtering rules for the plurality of UEs connected to the network (e.g., even when the anomalous traffic pattern does not relate to one or more of the plurality of UEs). For example, the network traffic management system can generate a first filtering rule in connection with the source and a first UE connected to the network prescribing that traffic between the source (e.g., an address associated with the source, such as an IP address) and the first UE (e.g., an address associated with the first UE, such as an IP address) is to be blocked. Continuing with the previous example, the network traffic management system can generate a second filtering rule in connection with the source and a second UE connected to the network prescribing that traffic between the source and the second UE (e.g., an address associated with the second UE, such as an IP address) is to be blocked. In some implementations, the first UE and the second UE of the example can be associated with a first entity and a second entity, respectively, that are different (e.g., unrelated entities). In some implementations, the first UE and the second UE of the example can be associated with the same entity.

In some implementations, the network traffic management system can generate respective filtering rules for a plurality of entities with UEs connected to the network (e.g., even when the anomalous traffic pattern does not relate to one or more of the UEs). For example, the network traffic management system can generate a first filtering rule for a first entity associated with one or more first UEs connected to the network (e.g., the first filtering rule indicating that traffic between the source and the one or more first UEs is to be blocked) and generate a second filtering rule for a second entity associated with one or more second UEs connected to the network (e.g., the second filtering rule indicating that traffic between the source and the one or more second UEs is to be blocked). In this way, an entity can define a security policy relating to a source that can be different from a security policy of another entity. Accordingly, network level security policies that might be overly broad can be avoided, thereby improving reliability of communications on the network and reducing disruptions to services provided by UEs connected to the network. In addition, selectively blocking traffic based on a directive of an entity conserves network resources and/or computing resources that would otherwise be wasted by blocking legitimate traffic (e.g., where legitimate traffic is resent after being blocked).

As described herein, respective filtering rules for the plurality of UEs and/or the plurality of entities can refer to separate filtering rules (e.g., "block traffic between the source and UE 1; block traffic between the source and UE 2," etc.), an entry in a single filtering rule (e.g., "block traffic between the source and: UE 1; UE 2," etc.), or a single filtering rule (e.g., "block traffic to and from the source.")

As shown in FIG. 1C, and by reference number 110, the network traffic management system can transmit a notification to an entity relating to a filtering rule generated by the network traffic management system. In some implementations, the notification can request that the entity affirm or decline the filtering rule. For example, the network traffic management system can transmit a notification to an entity associated with one or more UEs connected to the network. Continuing with the previous example, the notification can relate to a filtering rule indicating that traffic between a source and the one or more UEs associated with the entity is to be blocked.

In some implementations, the notification can request one or more additional, or alternative, responses from the entity. In some implementations, the notification can request that the entity select whether to report the source associated with the filtering rule. For example, if the entity affirms the filtering rule, the notification, or another prompt associated with the notification, can request that the entity select whether to report the source (e.g., report the source to a repository of known sources, report the source to a law enforcement agency, report the source to a domain registrar or a web hosting service, etc.). In some implementations, the notification can request that the entity select whether to pause the notification. For example, if the entity declines the filtering rule, the notification, or another prompt associated with the notification, can request that the entity select whether to pause the notification while additional data is collected regarding the source associated with the filtering rule (e.g., the entity can pause the notification for a time period, such as 1 week, to allow the network traffic management system to collect additional data, and the network traffic management system can retransmit the notification if the additional data indicates that the source is a security threat or the network traffic management system can delete the notification if the additional data indicates that the source is not a security threat). In some implementations, the notification can request that the entity select whether to place the source associated with the filtering rule on a whitelist (e.g., a filtering rule prescribing that traffic between the source and one or more UEs associated with the entity is to be allowed). For example, if the entity declines the filtering rule, the notification, or another prompt associated with the notification, can request that the entity select whether to place the source associated with the filtering rule on the whitelist. Continuing with the previous example, the notification, or another prompt associated with the notification, can request that the entity provide identifying information of the source (e.g., a name of the source, a relationship of the source to the entity, and/or the like).

In some implementations, the notification can be transmitted to an account or to a user device associated with the entity. For example, the notification can be transmitted to an account of the entity (e.g., an account of the entity that is maintained by the administrator of the network) that is accessible in a graphical user interface. Accordingly, the notification can be a message or an alert that is displayed in the graphical user interface. As another example, the notification can be transmitted to a user device (e.g., a smartphone, a tablet computer, a laptop computer, a desktop computer, and/or the like) associated with the entity as an alert (e.g., a push notification in connection with an application executing on the user device), an email, a text message, a telephone call with an interactive voice response system (e.g., a chatbot), and/or the like.

In some implementations, the notification can be associated with an expiration time. For example, the network traffic management system can automatically implement or discard a filtering rule associated with the notification in the absence of a response from the entity after the expiration of a time period (e.g., 1 day, 1 week, 1 month, etc.).

As shown by reference number 112, the network traffic management system can block traffic between a source and a UE, as prescribed in a filtering rule, based on the entity affirming the filtering rule. In some implementations, the network traffic management system can configure a traffic filter of the network traffic management system with the filtering rule based on the entity affirming the filtering rule. In some implementations, the network traffic management system can update an extant filtering rule of the traffic filter with information regarding the filtering rule based on the entity affirming the filtering rule. In some implementations, the network traffic management system can permit the provisional blocking of traffic between the source and the UE to continue without expiration based on the entity affirming the filtering rule. After the filtering rule is implemented, traffic, both inbound and outbound, between the source and the UE, as prescribed in the filtering rule, can be blocked by the traffic filter of the network traffic management system.

In some implementations, the network traffic management system can allow traffic between the source and the UE specified in the filtering rule based on the entity declining the filtering rule. For example, the network traffic management system can discard the filtering rule and/or remove the provisional blocking of traffic between the source and the UE based on the entity declining the filtering rule. As another example, the network traffic management system can implement a revised filtering rule prescribing that traffic between the source and the UE is to be allowed based on the entity declining the filtering rule.

In some implementations, after implementing the filtering rule, the network traffic management system can monitor traffic on the network over a time period (e.g., 1 week, 1 months, 1 year, etc.) to detect a communication attempt between the source and one of the plurality of UEs connected to the network. If no communication attempt is detected, the network traffic management system can remove the filtering rule or the network traffic management system can transmit a notification to the entity requesting that the entity affirm or decline that the filtering rule is to be removed. Based on the entity affirming that the filtering rule is to be removed, the network traffic management system can remove the filtering rule and allow traffic between the source and the UE.

In some implementations, an entity can add, delete, or modify a filtering rule via a graphical user interface. For example, if the entity determines that a filtering rule previously affirmed is no longer needed, the entity can delete the filtering rule via the graphical user interface. As another example, the entity can modify a filtering rule previously affirmed to add one or more new UEs to the filtering rule. In some implementations, the network traffic management system can automatically modify a filtering rule previously affirmed to add one or more new UEs to the filtering rule when a connection to the network of one or more new UEs is detected by the network traffic management system.

In some implementations, the network traffic management system can update one or more machine learning models based on an entity affirming, declining, adding, deleting, or modifying a filtering rule. For example, the network traffic management system can update a machine learning model (e.g., a machine learning model that has been trained to identify an anomalous traffic pattern) based on an entity declining a filtering rule that was generated in response to an output of the machine learning model.

As indicated above, FIGS. 1A-1C are provided as examples. Other examples can differ from what is described with regard to FIGS. 1A-1C.

Figure 2:
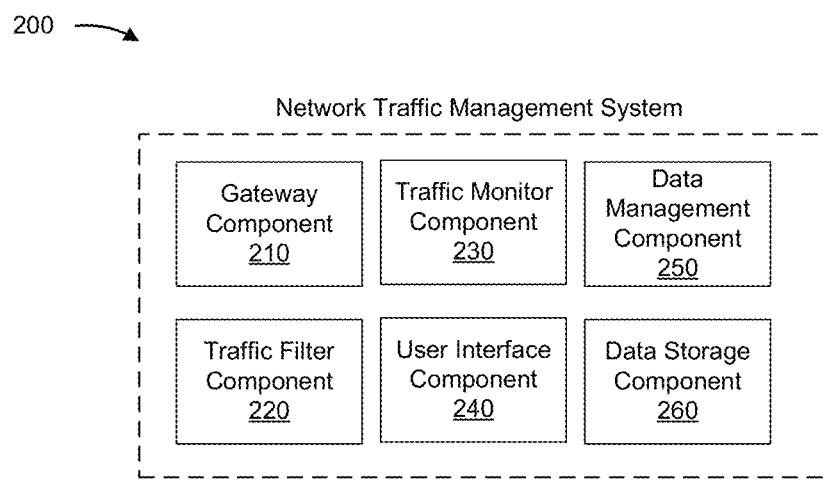
FIG. 2 is a diagram of an example implementation described herein.

FIG. 2 is a diagram of an example implementation 200 described herein. FIG. 2 shows example components of a network traffic management system. In some implementations, the network traffic management system can include gateway component 210, traffic filter component 220, traffic monitor component 230, user interface component 240, data management component 250, and data storage component 260.

As shown in FIG. 2, the network traffic management system can include a gateway component (e.g., gateway component 210). For example, the network traffic management system can use gateway component 210 to enable communications between a core network (e.g., a core network associated with a wireless network) and an external data network (e.g., the Internet). In some implementations, gateway component 210 can route a communication to a traffic filter (e.g., traffic filter component 220) if the communication is associated with a UE of an entity that has elected to filter traffic.

As further shown in FIG. 2, the network traffic management system can include a traffic filter component (e.g., traffic filter component 220). In some implementations, traffic filter component 220 can be configured with one or more filtering rules. In some implementations, the network traffic management system can use traffic filter component 220 to block, or allow, outbound communications from the core network and/or inbound communications from an external data network (e.g., the Internet) based on the one or more filtering rules.

As further shown in FIG. 2, the network traffic management system can include a traffic monitor component (e.g., traffic monitor component 230). For example, the network traffic management system can use traffic monitor component 230 to monitor traffic on the network, detect anomalous traffic patterns, compare a source to known sources identified as security threats, and generate filtering rules based on detected anomalous traffic patterns.

As further shown in FIG. 2, the network traffic management system can include a user interface component (e.g., user interface component 240). For example, the network traffic management system can use user interface component 240 to provide a set of user interfaces for display to a user (e.g., a user associated with an entity) of the network traffic management system. Continuing with the previous example, user interface component 240 can transmit a notification to the user, as described herein, and receive a response to the notification from the user.

As further shown in FIG. 2, the network traffic management system can include a data management component (e.g., data management component 250). For example, the network traffic management system can use data management component 250 to receive, store, process, modify, access, and/or the like data, such as filtering rules of traffic filter component 220, notifications and/or responses of user interface component 240, etc., as described herein. As further shown in FIG. 2, the network traffic management system can include a data storage component (e.g., data storage component 260). For example, data storage component 260 can include a data structure used to store data, results of analyses, and/or the like.

As indicated above, FIG. 2 is provided merely as an example. Other examples can differ from what was described with regard to FIG. 2. The number and arrangement of components shown in FIG. 2 are provided as an example. In practice, the network traffic management system can include additional components, fewer components, different components, or differently arranged components than those shown in FIG. 2. Additionally, or alternatively, a set of components (e.g., one or more components) of the network traffic management system can perform one or more functions described as being performed by another set of components of the network traffic management system.

Figure 3:
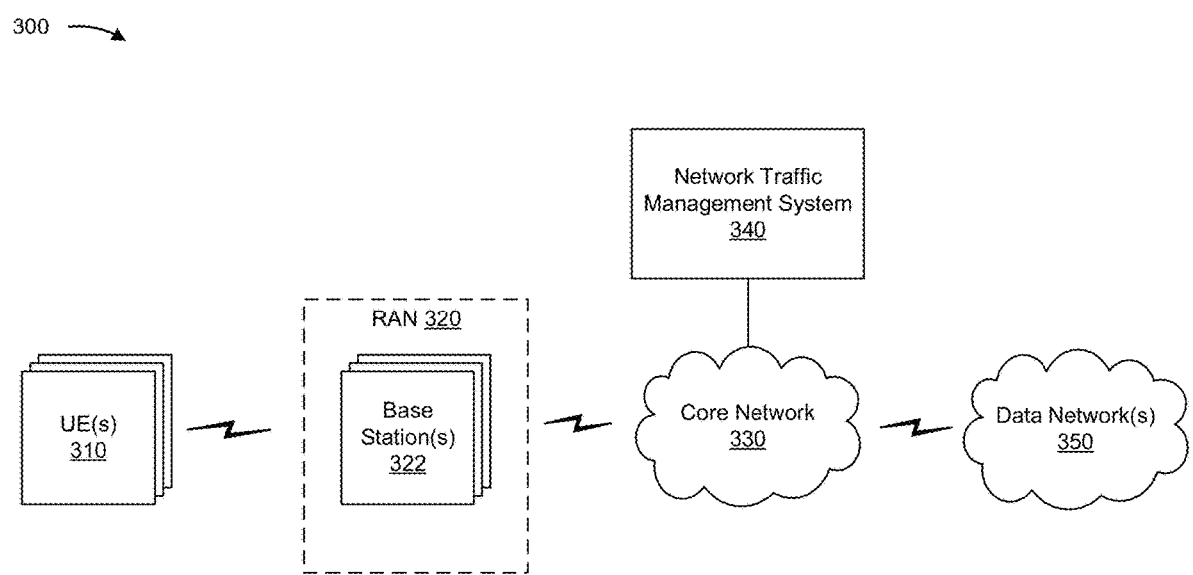
FIG. 3 is a diagram of an example environment in which systems and/or methods described herein can be implemented.

FIG. 3 is a diagram of an example environment 300 in which systems and/or methods, described herein, can be implemented. As shown in FIG. 3, environment 300 can include a UE 310, a Radio Access Network (RAN) 320, a core network 330, a network traffic management system 340, and a data network 350. Devices of environment 300 can interconnect via wired connections, wireless connections, or a combination of wired and wireless connections.

UE 310 includes one or more devices capable of communicating with RAN 320 and/or a data network 350 (e.g., via core network 330). For example, UE 310 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 310 can be capable of communicating using uplink (e.g., UE to RAN) communications, downlink (e.g., RAN to UE) communications, and/or sidelink (e.g., UE-to-UE) communications. In some implementations, UE 310 can include a machine-type communication (MTC) UE, such as an evolved or enhanced MTC (eMTC) UE. In some implementations, UE 310 can include an internet of things (IoT) UE, such as a narrowband IoT (NB-IoT) UE and/or the like.

RAN 320 includes one or more devices capable of communicating with UE 310 using a cellular radio access technology (RAT). For example, RAN 320 can include a base station 322, a base transceiver station, a radio base station, a node B, an evolved node B (eNB), a 5G next generation Node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 322 has the same characteristics and functionality of RAN 320, and vice versa. RAN 320 can transfer traffic between UE 310 (e.g., using a cellular RAT), RANs 320 (e.g., using a wireless interface or a backhaul interface, such as a wired backhaul interface), and/or core network 330. RAN 320 can provide one or more cells that cover geographic areas. Some RANs 320 can be mobile base stations. Some RANs 320 can be capable of communicating using multiple RATs.

In some implementations, RAN 320 can perform scheduling and/or resource management for UEs 310 covered by RAN 320 (e.g., UEs 310 covered by a cell provided by RAN 320). In some implementations, RAN 320 can be controlled or coordinated by a network controller, which can perform load balancing, network-level configuration, and/or the like. The network controller can communicate with RAN 320 via a wireless or wireline backhaul. In some implementations, RAN 320 can include a network controller, a self-organizing network (SON) module or component, or a similar module or component. In other words, RAN 320 can perform network control, scheduling, and/or network management functions (e.g., for other RAN 320 and/or for uplink, downlink, and/or sidelink communications of UEs 310 covered by RAN 320). In some implementations, RAN 320 can apply network slice policies to perform the network control, scheduling, and/or network management functions. In some implementations, RAN 320 can include a central unit and multiple distributed units. The central unit can coordinate access control and communication with regard to the multiple distributed units. The multiple distributed units can provide UEs 310 and/or other RANs 320 with access to data network 340 via core network 330.

Core network 330 includes various types of core network architectures, such as a 5G Next Generation (NG) Core, a Long-Term Evolution (LTE) Evolved Packet Core (EPC), and/or the like. In some implementations, core network 330 can be implemented on physical devices, such as a gateway, a mobility management entity, and/or the like. In some implementations, the hardware and/or software implementing core network 330 can be virtualized (e.g., through the use of network function virtualization and/or software-defined networking), thereby allowing for the use of composable infrastructure when implementing core network 330. In this way, networking, storage, and compute resources can be allocated to implement the functions of core network 330 in a flexible manner as opposed to relying on dedicated hardware and software to implement these functions.

Network traffic management system 340 includes one or more components (e.g., gateway component 210, traffic filter component 220, traffic monitor component 230, user interface component 240, data management component 250, and/or data storage component 260 of FIG. 2) capable of monitoring traffic on a network to detect anomalous traffic patterns, generating one or more filtering rules based on the anomalous traffic patterns, transmitting notifications regarding the filtering rules, and blocking or allowing traffic based on the filtering rules, as described above. Network traffic management system 340 can be implemented on a single device (e.g., a server device) or a distributed computing system that includes a plurality of devices (e.g., server devices, cloud computing devices, data center devices, etc.).

Data network 350 includes one or more wired and/or wireless data networks. For example, data network 340 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as one or more examples. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
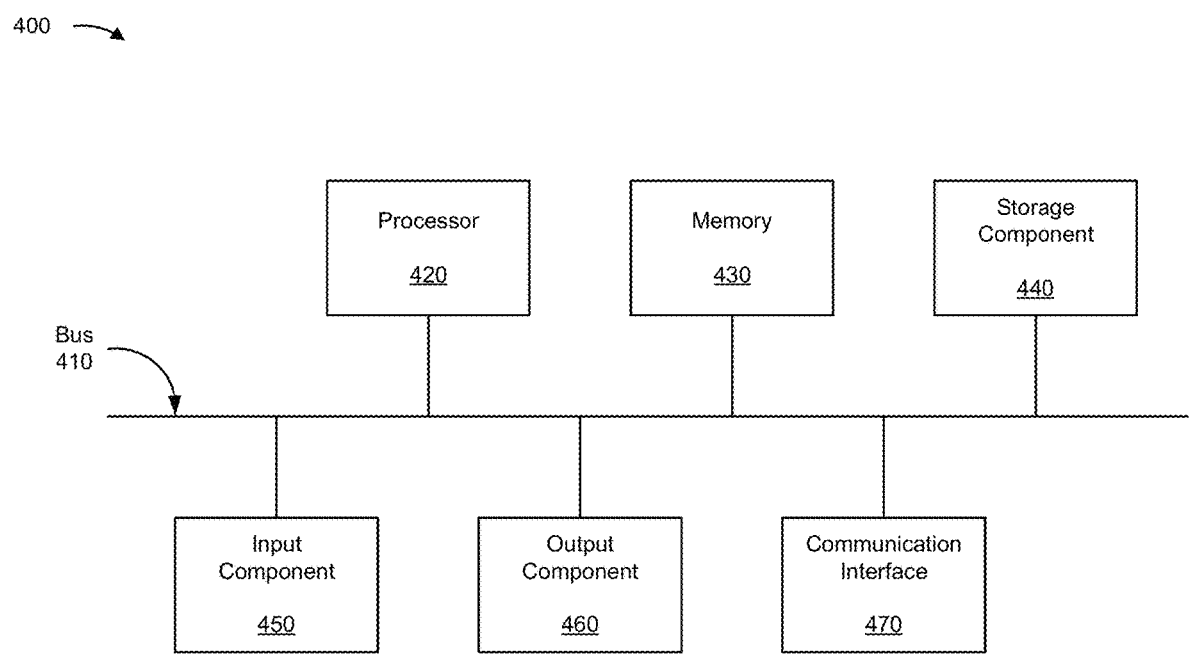
FIG. 4 is a diagram of example components of one or more devices of FIG. 3.

FIG. 4 is a diagram of example components of a device 400. Device 400 can correspond to UE 310, a base station (e.g., base station 322) of RAN 320, one or more functional elements or devices of core network 330, and/or one or more components or devices of network traffic management system 340. In some implementations UE 310, a base station (e.g., base station 322) of RAN 320, one or more functional elements or devices of core network 330, and/or one or more components or devices of network traffic management system 340 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

FIG. 5 is a flow chart of an example process 500 for user-determined network traffic filtering. In some implementations, one or more process blocks of FIG. 5 can be performed by a network traffic management system (e.g., network traffic management system 340). In some implementations, one or more process blocks of FIG. 5 can be performed by another device or a group of devices separate from or including the network traffic management system, such as a UE (e.g., UE 310).

As shown in FIG. 5, process 500 can include processing a communication between a source and user equipment, wherein the user equipment is one of a plurality of user equipment connected to a network, wherein the user equipment is associated with an entity (block 510). For example, the network traffic management system (e.g., using gateway component 210, traffic filter component 220, traffic monitor component 230, data management component 250, data storage component 260, processor 420, memory 430, storage component 440, input component 450, output component 460, communication interface 470, and/or the like) can process a communication between a source and user equipment, as described above. In some implementations, the user equipment is one of a plurality of user equipment connected to a network. In some implementations, the user equipment is associated with an entity.

As further shown in FIG. 5, process 500 can include determining that the communication is associated with an anomalous traffic pattern, wherein the anomalous traffic pattern is at least one of a first traffic pattern of the source or a second traffic pattern of the user equipment (block 520). For example, the network traffic management system (e.g., using traffic monitor component 230, data management component 250, data storage component 260, processor 420, memory 430, storage component 440, input component 450, output component 460, communication interface 470, and/or the like) can determine that the communication is associated with an anomalous traffic pattern, as described above. In some implementations, the anomalous traffic pattern is at least one of a first traffic pattern of the source or a second traffic pattern of the user equipment.

As further shown in FIG. 5, process 500 can include implementing a provisional blocking of traffic between the source and the plurality of user equipment connected to the network based on determining the anomalous traffic pattern (block 530). For example, the network traffic management system (e.g., using gateway component 210, traffic filter component 220, traffic monitor component 230, data management component 250, data storage component 260, processor 420, memory 430, storage component 440, input component 450, output component 460, communication interface 470, and/or the like) can implement a provisional blocking of traffic between the source and the plurality of user equipment connected to the network based on determining the anomalous traffic pattern, as described above.

As further shown in FIG. 5, process 500 can include generating a filtering rule in connection with the source and the user equipment based on determining the anomalous traffic pattern, wherein the filtering rule prescribes that traffic between the source and the user equipment is to be blocked (block 540). For example, the network traffic management system (e.g., using traffic filter component 220, traffic monitor component 230, data management component 250, data storage component 260, processor 420, memory 430, storage component 440, and/or the like) can generate a filtering rule in connection with the source and the user equipment based on determining the anomalous traffic pattern, as described above. In some implementations, the filtering rule prescribes that traffic between the source and the user equipment is to be blocked.

As further shown in FIG. 5, process 500 can include transmitting a notification to the entity associated with the user equipment, wherein the notification requests that the entity affirm the filtering rule (block 550). For example, the network traffic management system (e.g., using gateway component 210, user interface component 240, data management component 250, data storage component 260, processor 420, memory 430, storage component 440, output component 460, communication interface 470, and/or the like) can transmit a notification to the entity associated with the user equipment, as described above. In some implementations, the notification requests that the entity affirm the filtering rule.

As further shown in FIG. 5, process 500 can include blocking traffic between the source and the user equipment based on the entity affirming the filtering rule (block 560). For example, the network traffic management system (e.g., using gateway component 210, traffic filter component 220, traffic monitor component 230, data management component 250, data storage component 260, processor 420, memory 430, storage component 440, input component 450, output component 460, communication interface 470, and/or the like) can block traffic between the source and the user equipment based on the entity affirming the filtering rule, as described above.

Process 500 can include additional implementations, such as any single implementation or any combination of implementations described below and/or in connection with one or more other processes described elsewhere herein.

In some implementations, the network traffic management system can compare information identifying the source to information identifying a plurality of known sources to determine a match of the source and a known source of the plurality of known sources, where the known source is identified as being a security threat. Additionally, when generating the filtering rule, the network traffic management system can generate the filtering rule in connection with the source and the user equipment based on determining the anomalous traffic pattern and the match of the source and the known source.

In some implementations, the notification is a first notification, and the network traffic management system can monitor, over a time period, to detect a communication attempt between the source and one of the plurality of user equipment connected to the network, and transmit a second notification to the entity if the communication attempt is not detected over the time period. In some implementations, the second notification requests that the entity affirm that the filtering rule is to be removed. Additionally, the network traffic management system can allow traffic between the source and the user equipment based on the entity affirming that the filtering rule is to be removed.

In some implementations, the user equipment is first user equipment, the entity is a first entity, the notification is a first notification, and the filtering rule is a first filtering rule, and the network traffic management system can generate a second filtering rule in connection with the source and a second user equipment connected to the network based on determining the anomalous traffic pattern, where the anomalous traffic pattern is not related to the second user equipment and the second filtering rule prescribes that traffic between the source and the second user equipment is to be blocked. Additionally, the network traffic management system can transmit a second notification to a second entity associated with the second user equipment, wherein the second entity is different from the first entity and the notification requests that the second entity affirm the second filtering rule. Furthermore, the network traffic management system can block traffic between the source and the second user equipment based on the second entity affirming the second filtering rule.

In some implementations, the user equipment is first user equipment and second user equipment, associated with the entity, is connected to the network. Additionally, when generating the filtering rule, the network traffic management system can generate the filtering rule in connection with the source, the first user equipment, and the second user equipment based on determining the anomalous traffic pattern, where the anomalous traffic pattern is not related to the second user equipment and the filtering rule prescribes that traffic between the source and the first user equipment or the second user equipment is to be blocked.

In some implementations, the user equipment is first user equipment, and the first traffic pattern of the source includes a previous communication between the source and a second user equipment of the plurality of user equipment connected to the network, where a first address of the first user equipment and a second address of the second user equipment are consecutively numbered. In some implementations, the second traffic pattern of the user equipment includes a plurality of previous communications that do not relate to the source.

In some implementations, the notification further requests that the entity select an action that is one or more of reporting the source to a repository of known sources, reporting the source to a law enforcement agency, reporting the source to a web hosting service, pausing the notification, or placing the source on a whitelist.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   implementing, by a device and based on determining an anomalous traffic pattern on a network, a provisional blocking of traffic associated with the network,
   wherein the provisional blocking persists for a first time period;
   generating, by the device, during the first time period, and based on determining the anomalous traffic pattern, a filtering rule associated with the traffic;
   configuring, by the device, based on a first response to a first notification to an entity associated with the network, and based on the filtering rule, a filter associated with the traffic;
   monitoring, by the device and for a second time period, to detect a communication attempt associated with the traffic;
   transmitting, by the device and based on the communication attempt not being detected over the second time period, a second notification to the entity; and
   configuring, by the device and based on receiving a second response to the second notification affirming that the filtering rule is to be removed, the filter to allow the traffic.

2. The method of claim 1, wherein the traffic is between a source and one or more user equipment connected to the network.

3. The method of claim 1, wherein the first notification is associated with a first request that the entity affirm the filtering rule, and
 wherein the second notification is associated with a second request that the entity affirm that the filtering rule is to be removed.

4. The method of claim 1, wherein the provisional blocking of traffic is between a source and one or more first user devices associated with the network, and
 wherein the one or more first user devices include one or more second user devices that are not associated with the anomalous traffic pattern.

5. The method of claim 1, further comprising:
 storing the filtering rule in a queue until a response to the second notification is received.

6. The method of claim 1, wherein the traffic is between a source and a plurality of user equipment connected to the network,
 wherein the method further comprises:
  comparing information identifying the source to information identifying a plurality of known sources to determine a match of the source and a known source, of the plurality of known sources, identified as being a security threat, and
 wherein generating the filtering rule comprises:
  generating the filtering rule further based on determining the match of the source and the known source.

7. The method of claim 1, wherein determining the anomalous traffic pattern comprises at least one of:
 comparing a source of the traffic to a list of one or more known sources,
 determining that the anomalous traffic pattern is indicative of a network discovery behavior,
 detecting a communication associated with the traffic between a first user device and a second user device associated with different entities that include the entity,
 determining that the anomalous traffic pattern is associated with a temporal parameter, or
 determining the anomalous traffic pattern based on an output of a machine learning model.

8. A device, comprising:
 one or more memories; and
 one or more processors configured to:
  implement, based on determining an anomalous traffic pattern on a network, a provisional blocking of traffic associated with the network,
   wherein the provisional blocking persists for a first time period;
  generate, during the first time period and based on determining the anomalous traffic pattern, a filtering rule associated with the traffic;
  configure, based on a first response to a first notification to an entity associated with the network and based on the filtering rule, a filter associated with the traffic;
  monitor, for a second time period, to detect a communication attempt associated with the traffic;
  transmit, based on the communication attempt not being detected over the second time period, a second notification to the entity; and
  configure, based on receiving a second response to the second notification affirming that the filtering rule is to be removed, the filter to allow the traffic.

9. The device of claim 8, wherein the traffic is between a source and a one or more user equipment connected to the network.

10. The device of claim 8, wherein the first notification is associated with a first request that the entity affirm the filtering rule, and
 wherein the second notification is associated with a second request that the entity affirm that the filtering rule is to be removed.

11. The device of claim 8, wherein the provisional blocking of traffic is between a source and one or more first user devices associated with the network, and
 wherein the one or more first user devices include one or more second user devices that are not associated with the anomalous traffic pattern.

12. The device of claim 8, wherein the one or more processors are further configured to:
 store the filtering rule in a queue until a response to the second notification is received.

13. The device of claim 8, wherein the traffic is between a source and a plurality of user equipment connected to the network,
 wherein the one or more processors are further configured to:
  compare information identifying the source to information identifying a plurality of known sources to determine a match of the source and a known source, of the plurality of known sources, identified as being a security threat, and
 wherein the one or more processors, to generate the filtering rule, are configured to:
  generate the filtering rule further based on determining the match of the source and the known source.

14. The device of claim 8, wherein the one or more processors, to determine the anomalous traffic pattern, are further configured to at least one of:
 compare a source of the traffic to a list of one or more known sources,
 determine that the anomalous traffic pattern is indicative of a network discovery behavior,
 detect a communication associated with the traffic between a first user device and a second user device associated with different entities that include the entity,
 determine that the anomalous traffic pattern is associated with a temporal parameter, or
 determine the anomalous traffic pattern based on an output of a machine learning model.

15. A non-transitory computer-readable medium storing a set of instructions, the set of instructions comprising:
 one or more instructions that, when executed by one or more processors of a device, cause the device to:
  implement, based on determining an anomalous traffic pattern on a network, a provisional blocking of traffic associated with the network,
   wherein the provisional blocking persists for a first time period;
  generate, during the first time period and based on determining the anomalous traffic pattern, a filtering rule associated with the traffic;
  configure based on a first response to a first notification to an entity associated with the network, and based on the filtering rule, a filter associated with the traffic;
  monitor, for a second time period, to detect a communication attempt associated with the traffic;
  transmit, based on the communication attempt not being detected over the second time period, a second notification to the entity; and configure, based on receiving a second response to the second notification affirming that the filtering rule is to be removed, the filter to allow the traffic.

16. The non-transitory computer-readable medium of claim 15, wherein the traffic is between a source and one or more user equipment connected to the network.

17. The non-transitory computer-readable medium of claim 15, wherein the first notification is associated with a first request that the entity affirm the filtering rule, and
wherein the second notification is associated with a second request that the entity affirm that the filtering rule is to be removed.

18. The non-transitory computer-readable medium of claim 15, wherein the provisional blocking of traffic is between a source and one or more first user devices associated with the network, and
wherein the one or more first user devices include one or more second user devices that are not associated with the anomalous traffic pattern.

19. The non-transitory computer-readable medium of claim 15, wherein the one or more instructions further cause the device to:

store the filtering rule in a queue until a response to the second notification is received.

20. The non-transitory computer-readable medium of claim 15, wherein the one or more instructions, that cause the device to determine the anomalous traffic pattern, further cause the device to at least one of:

compare a source of traffic to a list of one or more known sources, determine that the anomalous traffic pattern is indicative of a network discovery behavior, detect a communication associated with the traffic between a first user device and a second user device associated with different entities that include the entity, or determine that the anomalous traffic pattern is associated with a temporal parameter, or determine the anomalous traffic pattern based on an output of a machine learning model.

* * * * *